(12) United States Patent
Neumann et al.

(10) Patent No.: US 6,173,921 B1
(45) Date of Patent: Jan. 16, 2001

(54) AIRPLANE PASSENGER PRIVACY AND SUPPORT APPARATUS

(75) Inventors: Yvette J. Neumann, Bothell; William C. Quan, Newcastle, both of WA (US)

(73) Assignee: The Boeing Company, Seattle, WA (US)

( * ) Notice: Under 35 U.S.C. 154(b), the term of this patent shall be extended for 0 days.

(21) Appl. No.: 09/217,596

(22) Filed: Dec. 21, 1998

(51) Int. Cl.[7] .................................................. B64D 11/06
(52) U.S. Cl. ......................................................... 244/118.6
(58) Field of Search ........................... 244/118.5, 118.6, 244/122 R, 129.1; 297/67, 118, 184.14, 354.13

(56) References Cited

U.S. PATENT DOCUMENTS

| | | | |
|---|---|---|---|
| 2,092,655 | * 9/1937 | Page | 244/118.6 |
| 2,608,366 | 8/1952 | Jergenson | 244/118.6 |
| 2,808,787 | 8/1957 | Murphy | 105/315 |
| 3,898,704 | * 8/1975 | Gallaher et al. | 5/2 R |
| 5,129,597 | 7/1992 | Manthey et al. | 244/362 |
| 5,393,013 | 2/1995 | Schneider et al. | 244/160 |
| 5,425,516 | 6/1995 | Daines | 244/105 |
| 5,577,358 | 11/1996 | Franke | 52/244 |
| 5,687,929 | 11/1997 | Hart | 244/312 |
| 5,716,026 | 2/1998 | Pascasio et al. | 244/105 |
| 5,740,989 | 4/1998 | Daines | 244/297 |
| 5,857,745 | * 1/1999 | Matsumiya | 297/354.13 |
| 5,992,798 | * 11/1999 | Ferry | 244/118.6 |

* cited by examiner

*Primary Examiner*—Peter M. Poon
*Assistant Examiner*—Francis T. Palo
(74) *Attorney, Agent, or Firm*—Lawrence W. Nelson; Robert H. Sproule

(57) ABSTRACT

Apparatus for providing privacy for seated airplane passengers also serves to provide support for passengers walking about the airplane cabin. In a first embodiment, the apparatus is positioned behind and adjacent to the seat. The apparatus includes a side wall that is aligned with the side of the seat along the cabin aisle, and a pedestal that is perpendicular to the aisle and which is mounted to the cabin floor. In a second embodiment, the apparatus includes a rear wall that is mounted to the pedestal in a manner perpendicular to the side wall and that is integrally connected to the side wall.

2 Claims, 6 Drawing Sheets

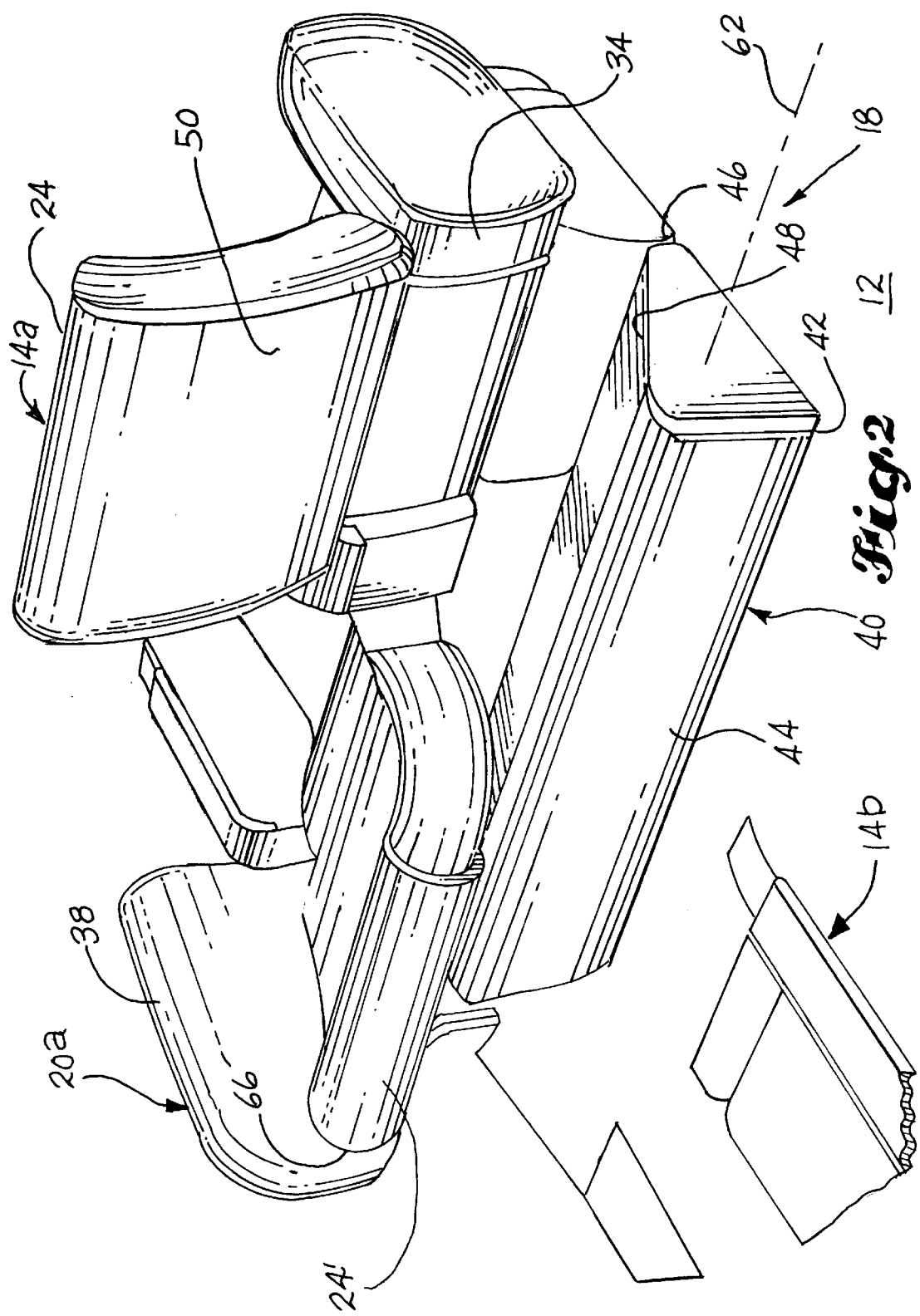

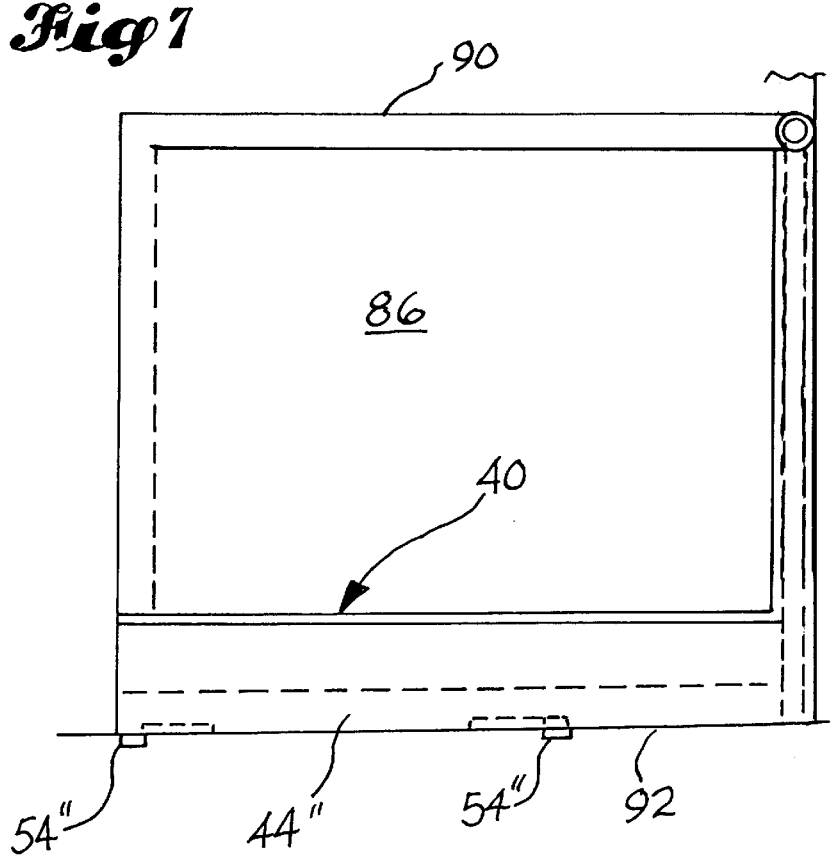
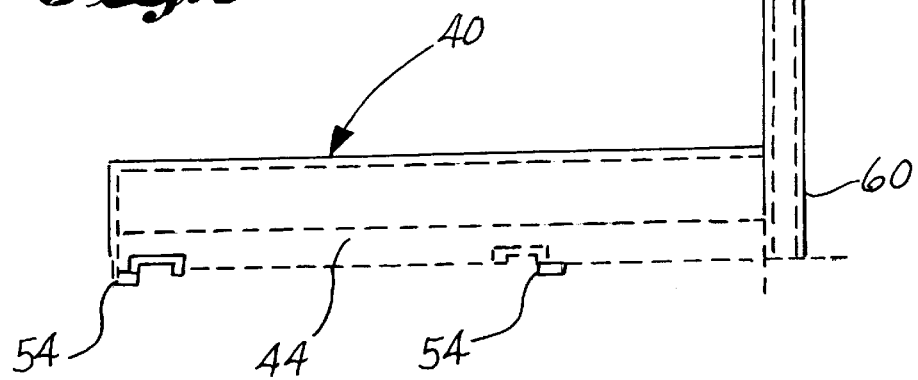

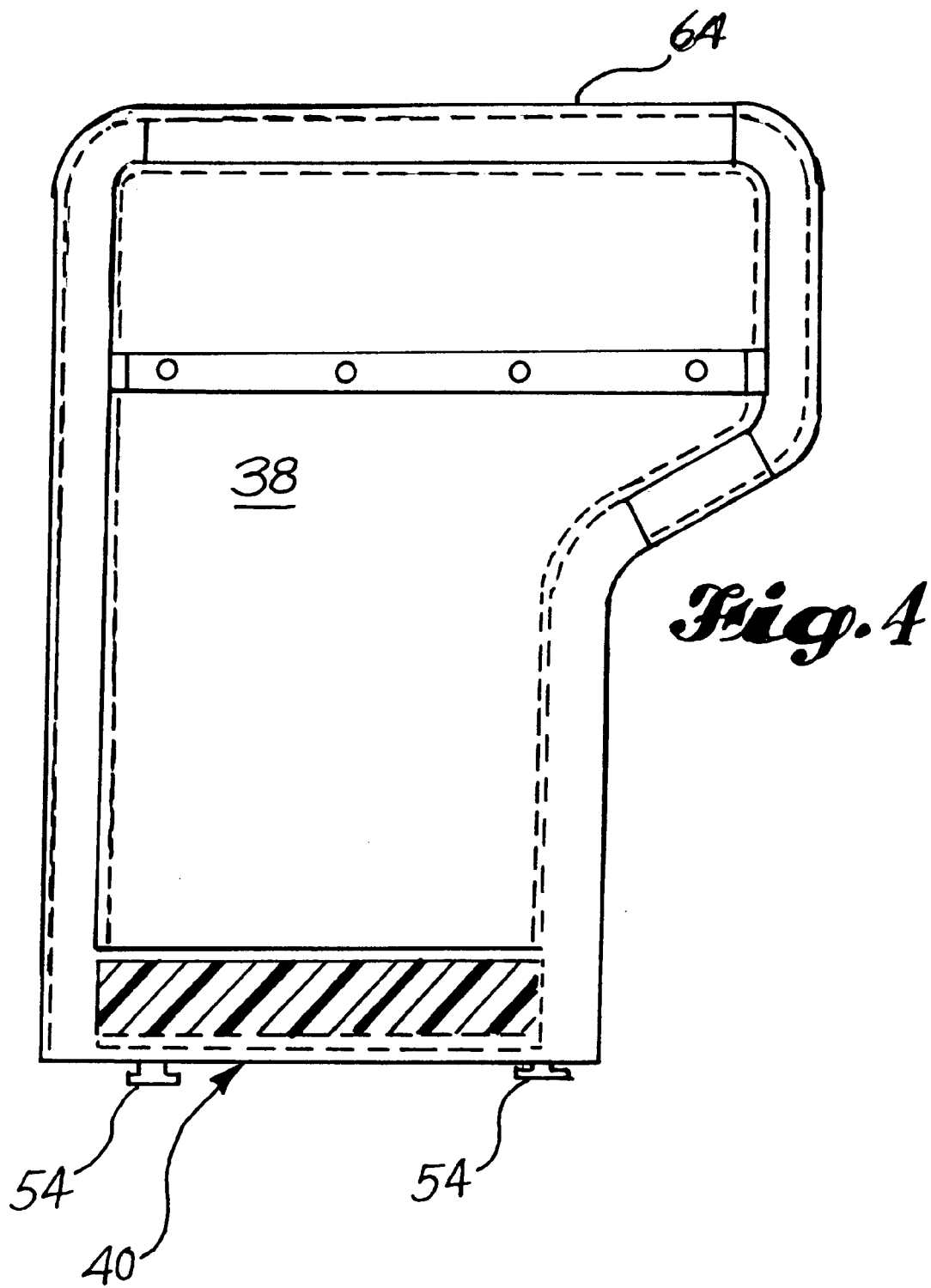

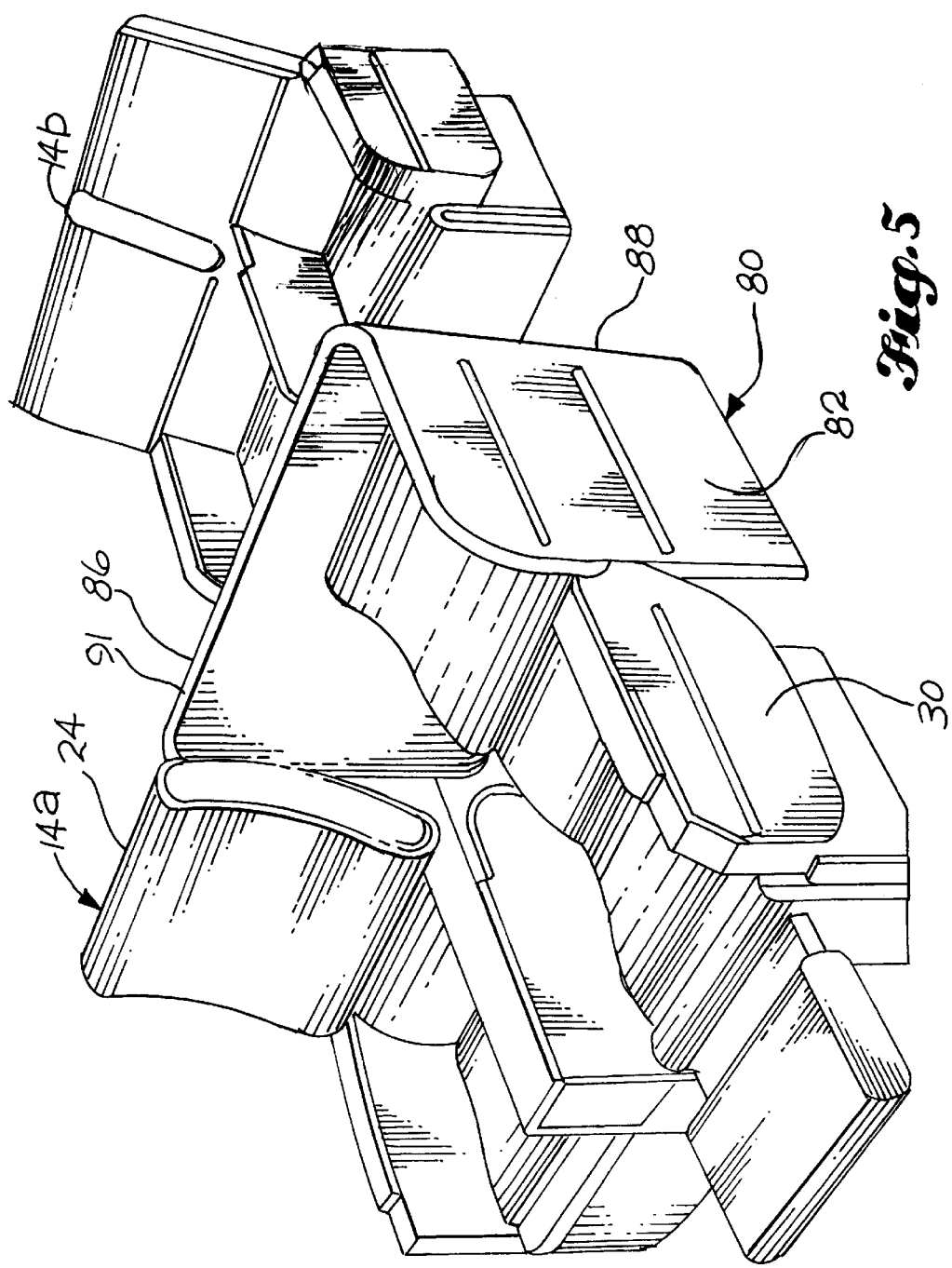

US 6,173,921 B1

AIRPLANE PASSENGER PRIVACY AND SUPPORT APPARATUS

TECHNICAL FIELD

The present invention relates to apparatus for providing privacy and support for passengers in the cabin of a commercial airplane.

BACKGROUND

In commercial airplanes, passengers often use the seat backs to support themselves when walking about the airplane cabin. Government regulations require that if passenger seat backs do not provide a firm handhold, then there must be a handhold grip or rail along each cabin aisle to enable passengers to steady themselves while walking in the aisles.

To provide this support, the Federal Aviation Administration has required that the seat backs be located behind each other no more than a distance of sixty inches when in the fully upright position. However, for some of their larger commercial airplanes, the airlines have requested the capability to increase the fore-to-aft distance between seats (particularly in the first class section of the airplane) so that the seat backs are spaced apart a distance greater than sixty inches when in the fully upright position. In addition, some airlines have requested the capability to allow the seats to fully recline. However, when the seats are in the fully reclined position, the seat backs are not available for use by the passengers to steady themselves when walking about the cabin. In order to satisfy the government regulations in these cases, it is necessary to provide a handhold grip or the like.

A number of possible approaches have been proposed to meet the requirement of providing a "handhold grip" or "rail". One such proposal was to provide a handhold grip or a rail that was attached to the overhead stowage bins. Unfortunately, this proposal was unacceptable because placement of the grip or rail would be at this height would render it unreachable by certain shorter members of the flying public.

Another possible approach would have been to provide a rail that was attached to the cabin floor and that extended along the cabin aisle. However, this approach also would have been unacceptable because it not only would have been aesthetically displeasing, in addition it would have added additional weight and cost to the airplane without providing any benefit other than compliance with the government regulations.

A number of approaches to dividing the passenger cabin of an airplane were disclosed in U.S. Pat. No. 5,393,013 by Schneider et al and U.S. Pat. No. 5,577,358 by Franke.

Accordingly, there is a need for a device that satisfies the government regulations for passenger support in the absence of seat backs, that is aesthetically pleasing, and provides additional benefits beyond simply meeting the government regulations.

SUMMARY

The present invention pertains to a privacy and support apparatus for the passengers of a commercial airplane. The airplane includes a cabin aisle and a seat located adjacent to the aisle and having a back that is movable between an upright position and a reclined position. In a first embodiment, the privacy and support apparatus includes a pedestal fastened to a floor of the airplane at a location behind the seat. In addition there is a side wall that is connected to the pedestal and that (i) extends in a rearward direction adjacent to the aisle a sufficient distance that when the seat back is in the reclined position, a rearward edge of the side wall extends further rearward than the top edge of the seat back so as to provide privacy for a passenger reclining in the seat. Also, the side wall extends upward a sufficient distance so that a top edge of the side wall is generally at least the same height as the top edge of the seat back, when the seat back is in the upright position, so as to provide support for passengers moving about the cabin.

In a second embodiment, the privacy and support apparatus also includes a rear wall portion that is connected to the side wall portion and that extends behind the seat generally perpendicular to the aisle. The rear side wall portion is located further rearward than a top edge of the seat back portion so as to provide privacy for a passenger reclining in the seat.

DESCRIPTION OF THE FIGURES

Other features of the present invention will be discussed in the following Detailed Description of the Invention in conjunction with the accompanying drawings, in which:

FIG. 2 is a forward facing isometric view of a portion of the interior of the airplane cabin showing the first embodiment of the present invention;

FIG. 3 is a rear view of the first embodiment;

FIG. 4 is a side view of the first embodiment;

FIG. 5 is a rearward facing isometric view of a portion of the airplane cabin interior and showing passenger seats together with a second embodiment of the present invention;

FIG. 7 is rear sectional view of the second embodiment.

DETAILED DESCRIPTION OF THE INVENTION

Figure 1:
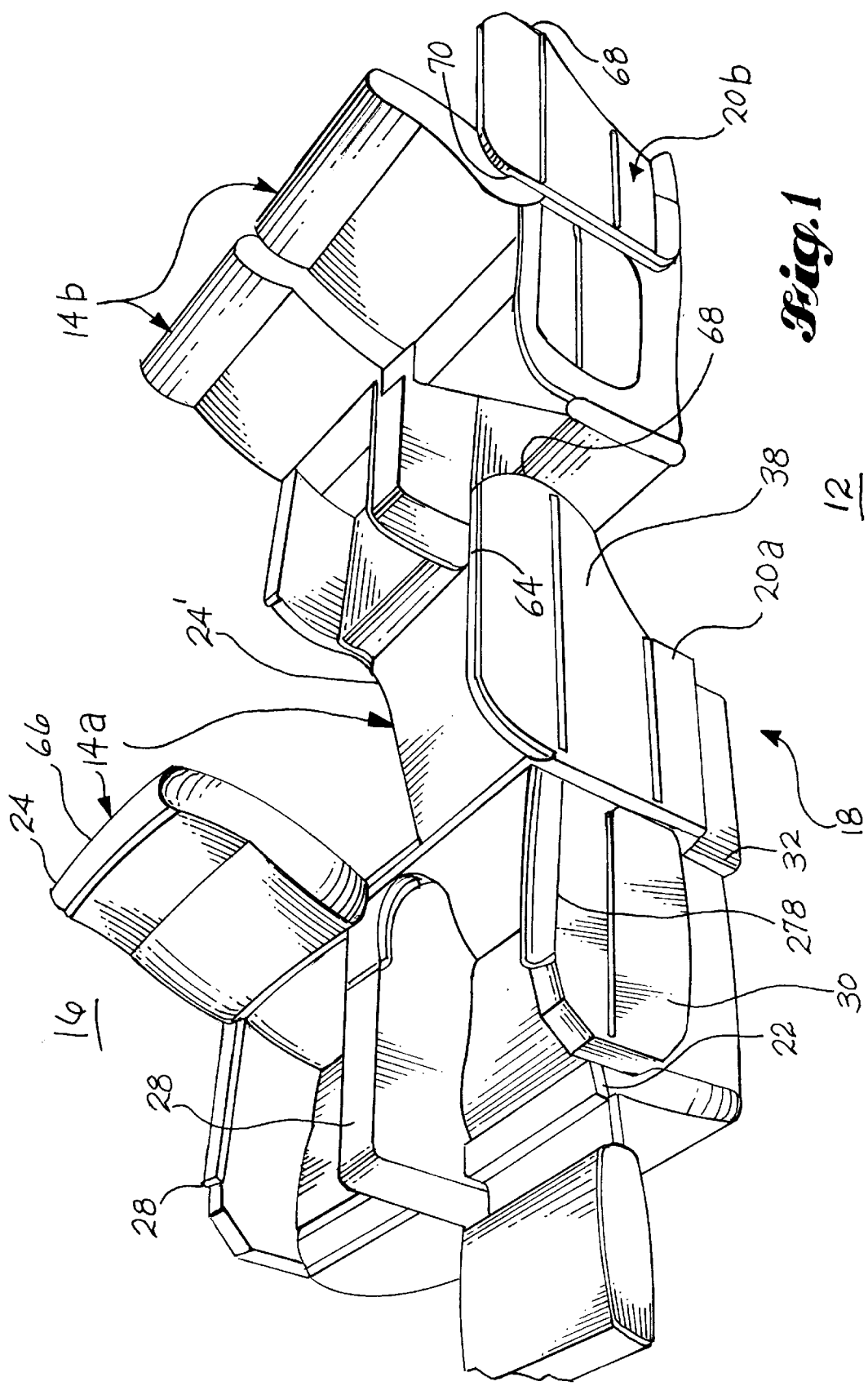
FIG. 1 is a rearward facing isometric view of a portion of the interior of an airplane cabin and showing passenger seats together with a first embodiment of the present invention.

Referring first to FIG. 1, there is shown a portion of an airplane passenger cabin including a floor 12 to which there are mounted a forward row-pair of conventional passenger seats indicated at 14a and a rearward row-pair of conventional passenger seats indicated at 14b. The passenger cabin includes a bulkhead wall 16 and a cabin aisle indicated at 18 that extends in a fore-and-aft direction through the cabin. Located behind each of the pair of seats 14a and 14b, respectively, are the privacy and support apparatus, indicated at 20a and 20b, of the present invention.

Before discussing the novel and unique apparatus 20 in more detail, a brief description of the conventional seat 14 will be provided by reference to the forward pair of seats 14a in FIG. 1. Each seat 14a includes a seat cushion 22 and a seat back 50 that is adjustable by the passenger between a generally upright position 24 and an almost horizontal (reclined) position 24'. Typically, the passenger selects the reclined position to sleep during the flight. The seat 14 also includes left and right side arm panels 28 that are located on opposite sides of the seat cushion 22 and which are typically used by the passenger as arm rests during the flight and which also help support the passenger in the seat. The side arm panel 28' next to the cabin aisle includes an outer surface that has attached thereto decorative material 32, and each side arm panel 30 includes a rear vertical surface 34 (FIG. 2).

In order to attach the seat 14 to the floor 12, a number of tracks (not shown) are mounted in recessed portions of the floor 12 in a generally fore-and-aft direction. These tracks have a generally inverted T-shaped cavity cross-section so as to receive conventional quick release mounting studs (also not shown) that are fastened to the bottom of the seat 14. The quick release mounting studs allow the position of the seat to be located anywhere along the track as selected by the airplane operator, and further allows the seat location to be easily changed if a different cabin seat configuration is desired.

Attention now will be turned in FIGS. 1 through 4 to the first embodiment 20 of the present invention. This embodiment includes a side wall portion 38 that is fastened to a pedestal portion indicated at 40 (FIG. 2) that in turn is fastened to the floor 12. The side wall 38 serves the dual purpose of not only providing support for passengers moving about the cabin, but in addition provides a privacy screen for reclining-seated passengers when the seat back is in the reclined position—typically for sleeping purposes. More specifically, the pedestal 40 includes a bottom horizontal surface 42 that is supported flush with the floor 12, a rear vertical surface 44, a front vertical surface 46, and an upper surface 48 that is inclined in downward direction when proceeding forward from the rear surface 44 to the front surface 46 so as not to interfere with the reclining of seat 24. As shown best in FIG. 3, the pedestal 40 includes conventional quick release mounting studs 54 that extend downward from the bottom of the pedestal 40 and which fit inside the seat tracks (not shown) in the floor (in the same manner as the seats are fastened to the floor) so as to fasten the pedestal to the floor at a location along the seat track that is selected by the airplane operator.

The privacy and support apparatus side wall 38 (FIG. 3) is fastened to a vertical side surface of the pedestal by conventional fasteners 60 and by bonding material (not shown) so that the side wall 38 is generally parallel to the cabin aisle 18 and generally is perpendicular to an imaginary longitudinal axis identified by a line 62 (FIG. 2) of the pedestal 40. In this manner, the side wall 38 can support any high loads resulting from passengers leaning and otherwise supporting themselves thereon.

The pedestal 40 is positioned so that its lengthwise axis 62 is parallel to the seat backs 24, and such that the privacy and support apparatus side wall 38 is aligned directly behind the seat side wall 30. The side wall 38 is made of the same material as the seat side wall 30 so as to give a general appearance that the privacy and support apparatus side wall 38 is a continuation of the seat side wall 30.

In order to meet government regulations requiring support for passengers when they are walking about the cabin, the privacy and support apparatus side wall 38 (FIG. 1) has a top edge 64 that is about thirty three inches above the floor 12—which is equivalent to the height of a top edge 66 of the seat back 24 when the seat back is in the fully upright position. In addition, government regulations require a maximum distance of sixty inches between a rear edge 68 of the side wall 38 of the forward privacy and support apparatus 20a and a forward edge 70 of the side wall 38 of the rearward privacy and support apparatus 20b. This requirement is satisfied in the present embodiment by extending the rear edge 68 of the side wall 38 far enough rearward so that when the seat back 24 is in the fully reclined position, the rear edge 68 of the side wall 38 extends beyond the top edge 66 of the seat back 24, thus providing privacy around the head area of the reclined passenger.

Figure 6:
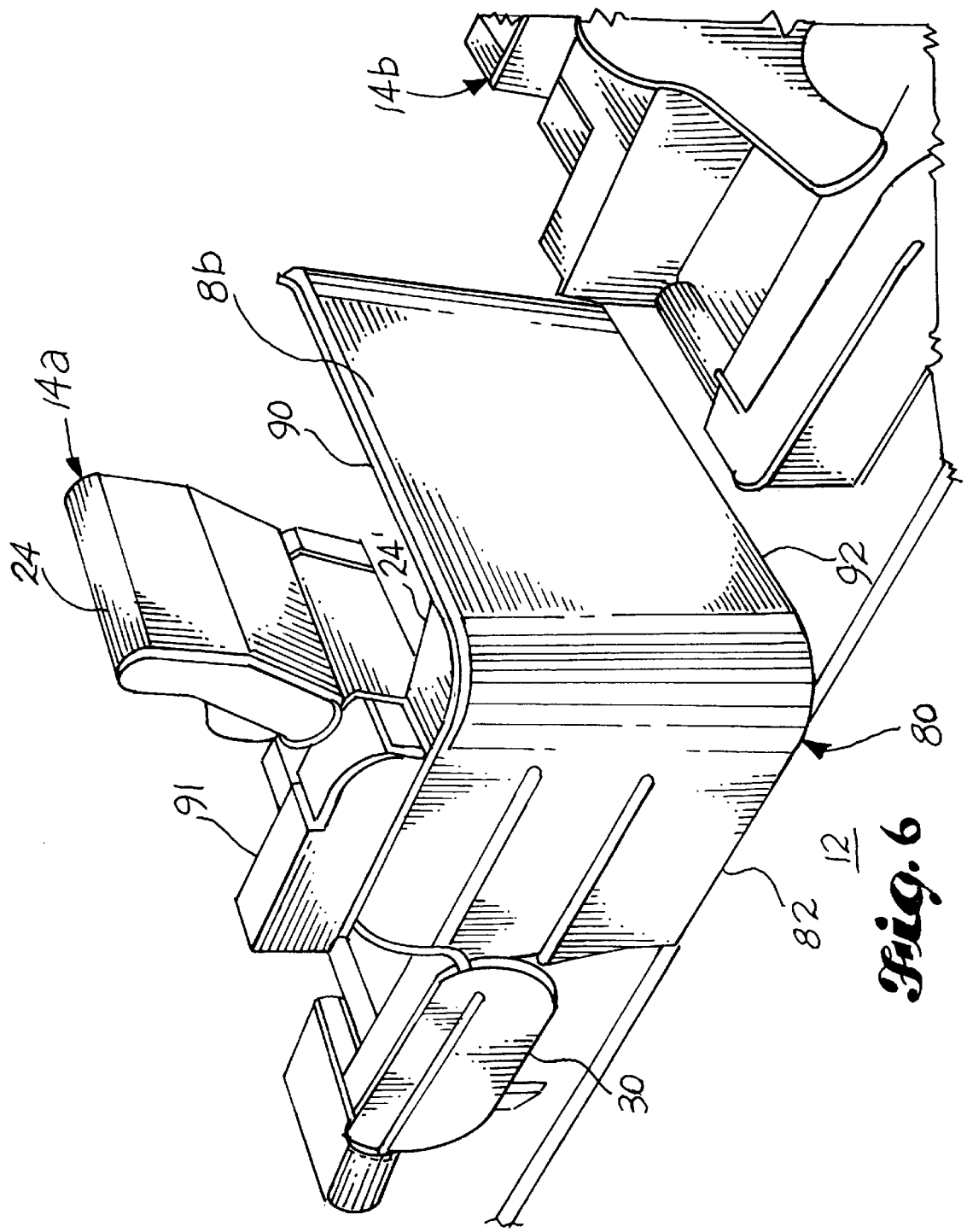
FIG. 6 is a forward facing isometric view of a portion of the airplane cabin and showing the second embodiment of the present invention.

Referring now to FIGS. 5 through 7, there is shown a second embodiment, indicated at 80, of the present invention where like elements described in the previous embodiment are identified in this embodiment with the same number followed by a double prime (") symbol. As shown in these figures, the privacy/support apparatus 80 includes a side wall 82 that is similar to the side wall 38 of the first embodiment and which is connected to the pedestal 40" in the same manner. This second embodiment includes an additional rear wall 86 that is integrally connected to a rear edge 88 of the side wall 82, and that extends behind both seat pairs 14a. More specifically, the rear wall 86 is fastened to the rear surface 44" of the pedestal 40" in a manner parallel to the pedestal lengthwise axis. The rear wall 86 includes a top edge 90 that is the same height as a top edge 91 of the side wall 82, and a bottom edge 92 that is flush with the cabin floor 12. In this manner, when the passengers seated in seats 14 are fully reclined, they are not only provided privacy from the cabin aisle, but in addition they have privacy from the passengers seated behind them. In addition, the rear wall 86 provides support to those passengers walking to and from the rearward seats 14b and who would not have the benefit of the support normally providing by the front seat backs when getting into and out of their seats.

What is claimed is:

1. In an airplane having a floor, which has an aisle, and a seat, which is located adjacent to the aisle, the seat having a back that is movable between an upright position and a reclined position, and a privacy and support apparatus, said privacy and support apparatus comprising:

an immobile pedestal fastened to the floor of the airplane at a location behind the seat; and a side wall that is connected to the pedestal and that (i) extends in a rearward direction adjacent to the aisle a sufficient distance that when the seat back is in the reclined position a rearward edge of the side wall extends further rearward than a top edge of the seat back so as to provide privacy for a passenger reclining in the seat, and (ii) extends upward a sufficient distance so that a top edge of the side wall is generally at least the same height as a top edge of the seat back when the seat back is in the upright position so as to provide support for passengers moving about the cabin.

2. The privacy and support apparatus as set forth in claim 1 additionally comprising a rear wall that is connected to the side wall and that extends behind the seat in a manner generally perpendicular to the aisle and that is located further rearward than a top edge of the seat back so as to provide privacy for a passenger reclining in the seat.

* * * * *